United States Patent
Mehta et al.

(10) Patent No.: US 9,043,353 B2
(45) Date of Patent: May 26, 2015

(54) QUERY STREAM EXECUTION USING PRIORITY GRADIENT MULTIPROGRAMMING

(75) Inventors: Abhay Mehta, Austin, TX (US); Chetan Kumar Gupta, Austin, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1697 days.

(21) Appl. No.: 12/251,220

(22) Filed: Oct. 14, 2008

(65) Prior Publication Data

US 2010/0094827 A1    Apr. 15, 2010

(51) Int. Cl.
*G06F 17/30* (2006.01)

(52) U.S. Cl.
CPC .... *G06F 17/30286* (2013.01); *G06F 17/30516* (2013.01)

(58) Field of Classification Search
USPC ................. 707/713, 718, 719, 720, 769, 770, 707/999.3, 999.4
See application file for complete search history.

(56) References Cited

U.S. PATENT DOCUMENTS

| 6,502,062 | B1 |  | 12/2002 | Acharya et al. |  |
| 7,805,436 | B2 | * | 9/2010 | Richards et al. | 707/720 |
| 2004/0148420 | A1 |  | 7/2004 | Hinshaw et al. |  |
| 2006/0069803 | A1 |  | 3/2006 | Clark et al. |  |
| 2007/0239658 | A1 | * | 10/2007 | Cunningham et al. | 707/2 |
| 2007/0288649 | A1 |  | 12/2007 | Song et al. |  |
| 2009/0216718 | A1 | * | 8/2009 | Agrawal et al. | 707/3 |

OTHER PUBLICATIONS

Choi et al., "Real-Time stream Management System for Large Volume of RFID Events", IEEE, Aug. 2008, p. 515-521. Download: http://ieeexplore.ieee.org/stamp/stamp.jsp?arnumber=04622876.*
Krompass et al., "Dynamic workload management for very large data warehouses: juggling feathers and bowling balls", ACM, Sep. 2007, pp. 1105-1115. Download: http://delivery.acm.org/10.1145/1330000/1325976/p1105-krompass.pdf?key1=1325976&key2=2853135921&coll=DL&dl=ACM&CFID=6467760&CFTOKEN=20302410.*

* cited by examiner

*Primary Examiner* — Hares Jami
(74) *Attorney, Agent, or Firm* — Koestner Bertani LLP

(57) ABSTRACT

A workload management system and operating method are configured for query stream execution using priority gradient programming. The workload management system comprises a database system that executes queries at a priority gradient wherein no more than a predetermined number of queries execute at a particular priority, and a scheduler that schedules queries for execution on the database system and restricts the queries to a number that consumes less than total system memory.

15 Claims, 7 Drawing Sheets

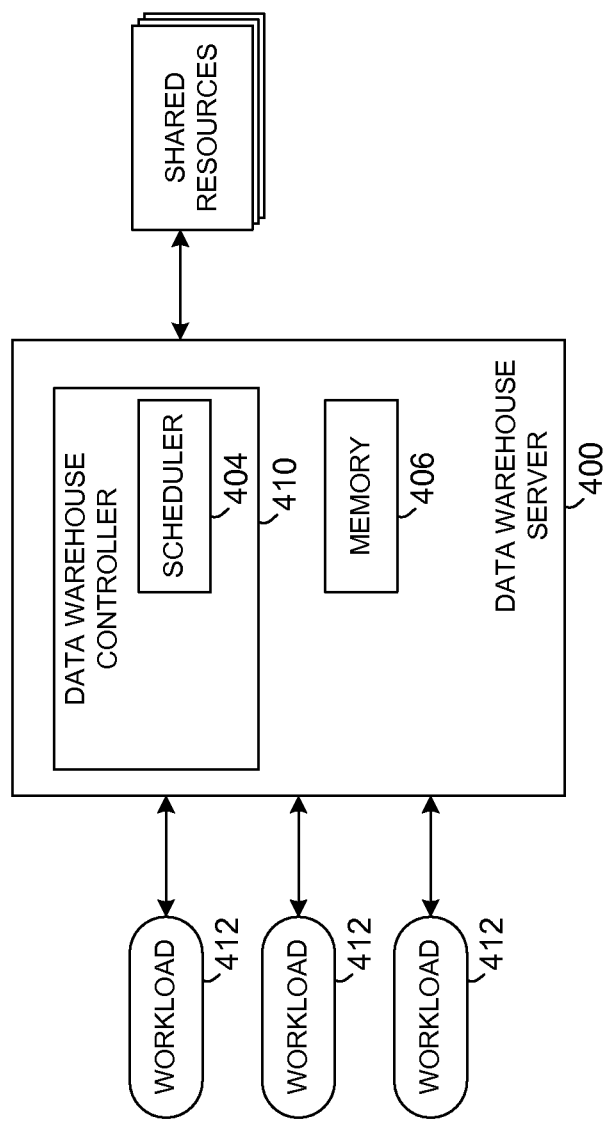

QUERY STREAM EXECUTION USING PRIORITY GRADIENT MULTIPROGRAMMING

BACKGROUND

Multiprogramming is a computing technique operating on the basis that if a job is waiting for an I/O request to complete, the CPU can process another job during the wait, thereby increasing throughput of the number of jobs processed by the system. Virtual Memory (VM) can be combined with multiprogramming to enable even higher throughput, unfortunately creating the potential for a system to thrash, in which more time is spent replacing pages in physical memory and less time is available for the actual processing of the data pages. An optimal multiprogramming level allows a system to operate at maximum throughput level while avoiding both under-load and thrashing (over-load). The problem of operating a system at an optimal multiprogramming has been addressed using three basic prior techniques including a feed-forward approach, a feed-back approach, and a static MPL approach.

In the feed-forward approach, thrashing is acknowledged to be caused by over-allocation of memory. The feed-forward approach addresses memory allocation by estimating the amount of memory to be used by a job and only admit the job if the system has enough free memory to accommodate the estimated memory of the job. A problem with the feed-forward approach is necessity for an accurate estimate of the amount of memory a job uses. For example, the jobs of interest can be Business Intelligence (BI) queries on an Enterprise Data Warehouse. BI queries are typically very complex and accurately estimating the amount of memory required by a query is difficult.

The feed-back approach employs sampling of a selected performance metric and controlling MPL accordingly. If the performance metric exceeds a selected target value then the rate of admitting jobs into the system is reduced. If the performance metric is less than a selected minimum, then the rate of admitting jobs into the system is increased. Thus, the performance metric is maintained at an optimal rate by controlling the admission of jobs into the system. Examples of feed-back techniques can include adaptive control of conflict ratio, an analytic model using a fraction of blocked transactions as the performance metric, wait-depth limitation, and others. A difficulty with the feed-back approach is selection of sampling interval over which the performance metric is measured. If the sampling interval is too small, then the system may oscillate and become very unstable. If the sampling interval is too large, then the system may become very slow to react to a changing workload and thus not act sufficiently quickly to prevent overload and under-load behavior. Typical Business Intelligence workloads shift rapidly between small queries and huge queries. A performance metric and an associated sampling interval which is appropriate for one workload type may be unsuitable for a different kind of workload that occurs only seconds later on the system. Thus the feed-back loop approach is typically inappropriate for a rapidly changing BI workload.

In a static MPL approach, a selected typical workload is run multiple times through the system. Each run is performed at a different MPL setting and the corresponding throughput is measured. An optimal MPL is then chosen based on the trial and error experiments and based on guesswork. Several problems arise with the static MPL approach. First, performing the trial and error experiments is expensive and inaccurate. The resulting MPL set by the system may work marginally well for the workload used in the testing, but is unlikely to work well with other workloads. Furthermore, the static nature of the approach in inappropriate for handling a dynamic shift in the workload. The static MPL approach is often used despite the inadequacies due to relative simplicity of implementation.

A common use of an enterprise data warehouse is running a continuous stream of queries. The objective is to receive return results in the shortest possible time. The time duration for a continuous stream of database queries to run on a system depends, among other things, on the number of concurrent streams that are used to run the queries. The number is known as MPL (Multi Programming Level). If the MPL is too low, then the database system may be under-loaded such that the workload finishes sooner if the number of concurrent streams is increased. Hence, database users attempt to achieve a higher throughput (as measured in queries finished per unit time) by increasing the MPL. A drawback with the strategy is that if the MPL is too high then the database system may be overloaded and experiences severe memory contention and CPU thrashing. Thrashing results in severe performance deterioration. When a user first confronts a new workload, the correct MPL to run the workload is unknown and the user has to determine the MPL at which to execute the workload. At lower levels, increasing the MPL can lead to an increase in throughput. But as the MPL is increased, a danger arises of entering an overload region where even slightly higher than optimal MPLs result in a lower throughput.

The problem of managing MPL is further confounded since a typical Business Intelligence (BI) workload can fluctuate rapidly between long resource-intensive queries and short less-intensive queries. At each instant of time, the system can experience a different mix of queries and thus use a different optimal setting of MPL. Furthermore, as throughput is increased, very often increasing MPL by even one can result in severe performance deterioration rather than a gradual decline in performance.

SUMMARY

Embodiments of a workload management system and operating method are configured for query stream execution using priority gradient multi-programming. The workload management system comprises a database system that executes queries at a priority gradient wherein no more than a predetermined number of queries execute at a particular priority, and a scheduler that schedules queries for execution on the database system and restricts the queries to a number that consumes less than total system memory.

BRIEF DESCRIPTION OF THE DRAWINGS

Embodiments of the invention relating to both structure and method of operation may best be understood by referring to the following description and accompanying drawings:

FIG. 4 is a schematic block diagram depicting an embodiment of a data warehouse server that implements query stream execution using priority gradient programming.

DETAILED DESCRIPTION

Embodiments of systems and methods execute a stream of queries on a priority gradient.

A technique, which can be called Continuous-PGM, uses Priority Gradient Multiprogramming (PGM) to run a stream of queries. For a given workload PGM protects against overload while maintaining the high throughput advantage of high Multi-Programming Levels (MPLs) by either eliminating overload, or increasing the MPL value at which overload occurs, thereby reducing the possibility of thrashing.

In an example application, Priority Gradient Multiprogramming (PGM) can be used to construct a workload management system for a batch of queries. In a specific example, PGM can be used for a batch of queries called Business Intelligence Batch Manager (BIBM). PGM can be used to create a workload management system to run a stream of queries.

Figure 1:
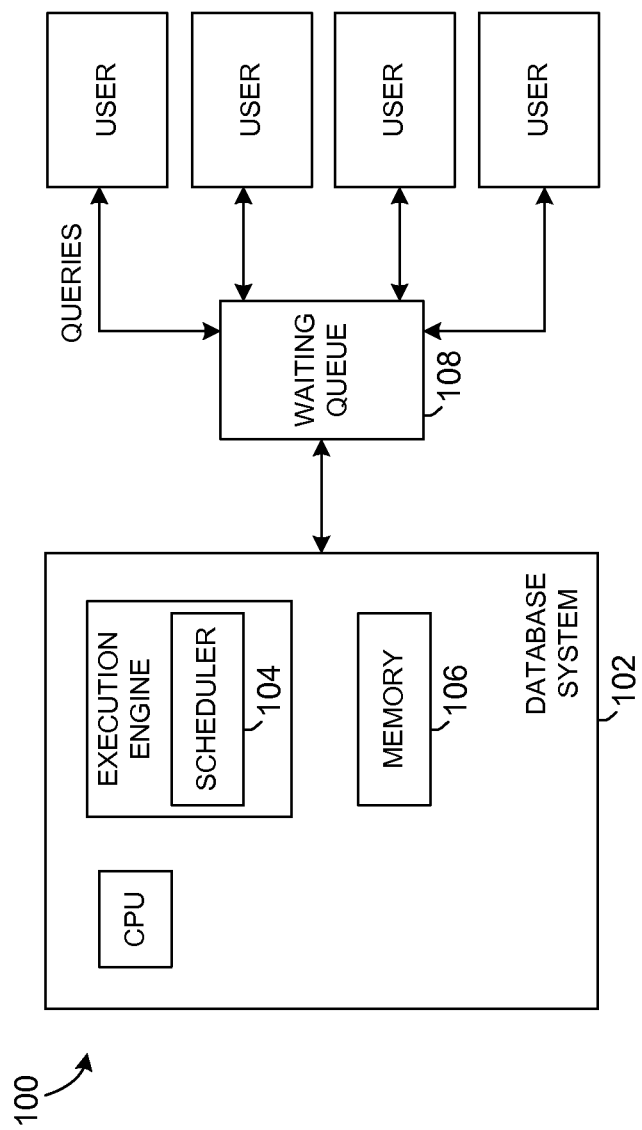
FIG. 1 is a schematic block diagram illustrating an embodiment of a workload management system configured for query stream execution using priority gradient programming.

Referring to FIG. 1, a schematic block diagram illustrates an embodiment of a workload management system 100 configured for query stream execution using priority gradient programming. The workload management system 100 comprises a database system 102 that executes queries at a priority gradient wherein no more than a predetermined number of queries execute at a particular priority, and a scheduler 104 that schedules queries for execution on the database system 102 and restricts the queries to a number that consumes less than total system memory.

New queries can be inserted at a lower priority than the lowest running priority. In an example embodiment, priority compaction can be implemented to ensure availability of priority levels. The scheduler 104 can perform compaction of priority by determining when no more priority levels less than the lowest running priority level are available, then allowing existing queries executing on the database system 102 to finish, and start again with the highest priority level.

In another embodiment, priority elevation or "bumping up" can be implemented to ensure availability of priority levels. The scheduler 104 can implement priority elevation by inserting a received query for execution on the database system 102 at a priority lower than queries currently executing on the database system 102. The scheduler 104 determines whether the priority of the received query is a predetermined minimum priority. If so, the scheduler 104 controls the database system 102 to execute the currently executed queries until completion without inserting addition queries. The scheduler 104 restarts query insertion at a predetermined highest priority.

The scheduler 104 can be configured to maintain a sum of memory requirements for queries executing on the database system 102 that is less than total system memory 106. The scheduler 104 receives a query in a stream of queries and estimates a memory requirement of the received query. If the estimated memory requirement plus the maintained sum is less than the total system memory 106, the scheduler 104 inserts the received query for execution on the database system 102. In contrast if the assigned memory requirement plus the maintained sum is greater than or equal to the total system memory 106, execution of the received query is delayed.

The workload management system 100 can further comprise a waiting queue 108 that queues the stream of queries in order of arrival. The scheduler 104 can insert a query at the tail of the waiting queue 108 for execution on the database system 102 if the assigned memory requirement plus the maintained sum is less than the total system memory 106. The scheduler 104 maintains the query at the tail of the waiting queue 108 if the assigned memory requirement plus the maintained sum is greater than or equal to the total system memory 106.

The scheduler 104 inserts queries in order from the waiting queue 108 for execution.

For example, the database system 102 can be configured to execute the queries at a priority gradient wherein no more than one query executes at a particular priority.

The scheduler 104 can set priorities in the priority gradient wherein successive priorities are separated by a predetermined step size and number of available priority levels is fixed.

Figure 2:
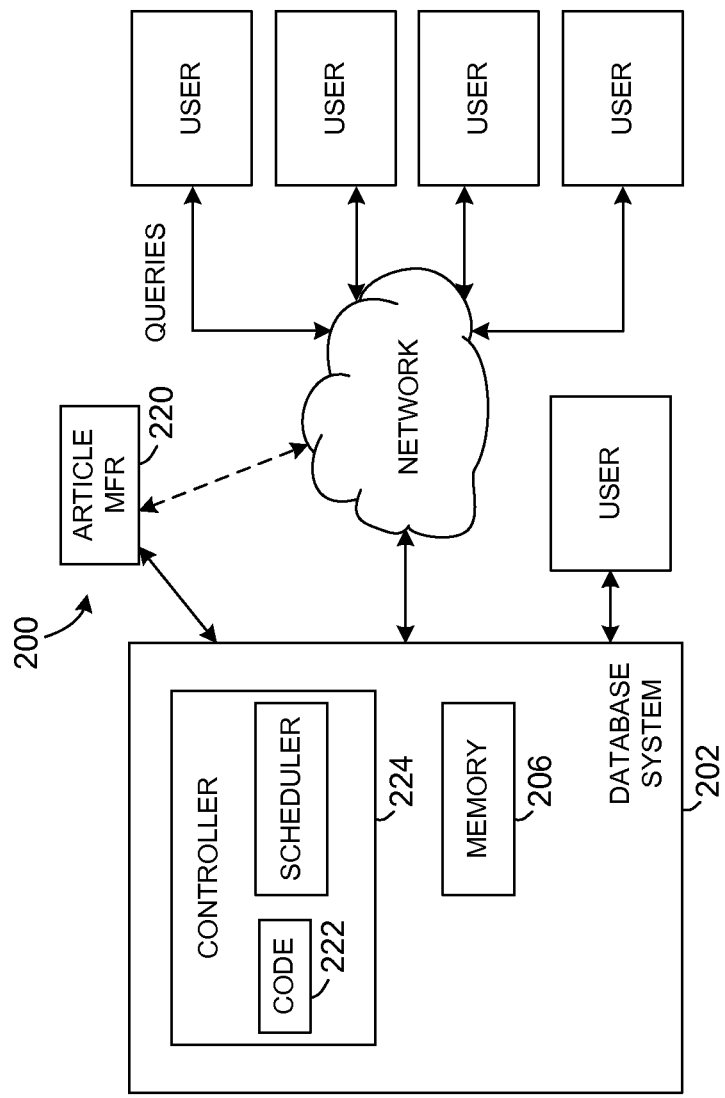
FIG. 2 is a schematic block diagram depicting an embodiment of an article of manufacture that implements query stream execution using priority gradient programming.

Referring to FIG. 2, a schematic block diagram depicts an embodiment of an article of manufacture 200 that implements query stream execution using priority gradient programming. The article of manufacture 200 comprises a controller-usable medium 220 having a computer readable program code 222 embodied in a controller 224 for streaming queries into a database system 202. The computer readable program code 222 further comprises code causing the controller 224 to restrict queries for execution on the database system 202 to a number that consumes less than total system memory 206, and code causing the controller 224 to execute queries at a priority gradient wherein no more than a predetermined number of queries execute at a particular priority.

In an example implementation, the queries can be executed at a priority gradient wherein no more than one query executes at a particular priority.

Figure 3A:
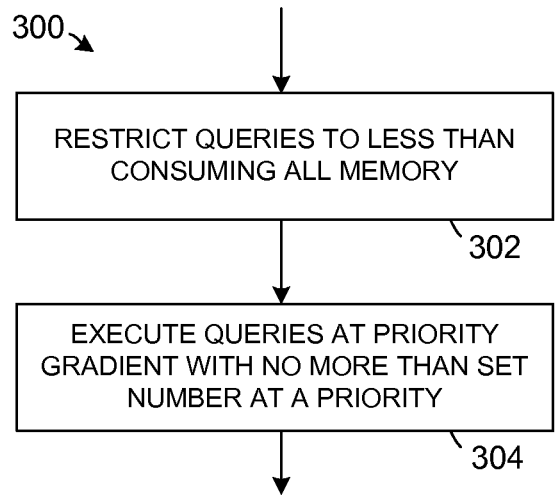
FIGS. 3A through 3E are flow charts illustrating one or more embodiments or aspects of a computer-executed method for executing a query stream using priority gradient programming.

Referring to FIGS. 3A through 3E, flow charts illustrate one or more embodiments or aspects of a computer-executed method for executing a query stream using priority gradient programming. FIG. 3A depicts a computer-executed method 300 for streaming queries into a system. The method 300 comprises restricting 302 queries for execution on a system to a number that consumes less than total system memory, and executing 304 queries at a priority gradient wherein no more than a predetermined number of queries execute at a particular priority.

Priorities in the priority gradient can be set so that successive priorities are separated by a predetermined step size and number of available priority levels is fixed.

Figure 3B:
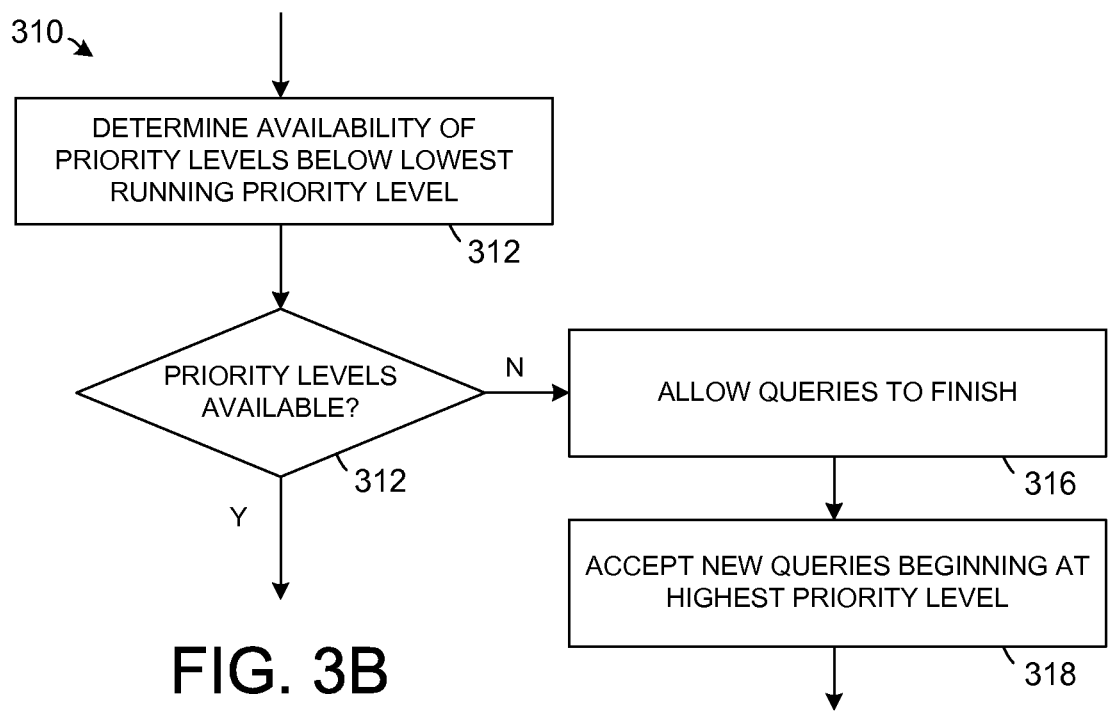

Referring to FIG. 3B, a flow chart shows a computer-executed method 310 for streaming queries using priority compaction. The method 310 comprises determining 312 whether additional priority levels are available that are lower than the lowest running priority level. If no such priority levels are available 314, then the existing queries are allowed to finish 316, and incoming queries begin again 318 with the highest priority level.

Figure 3C:
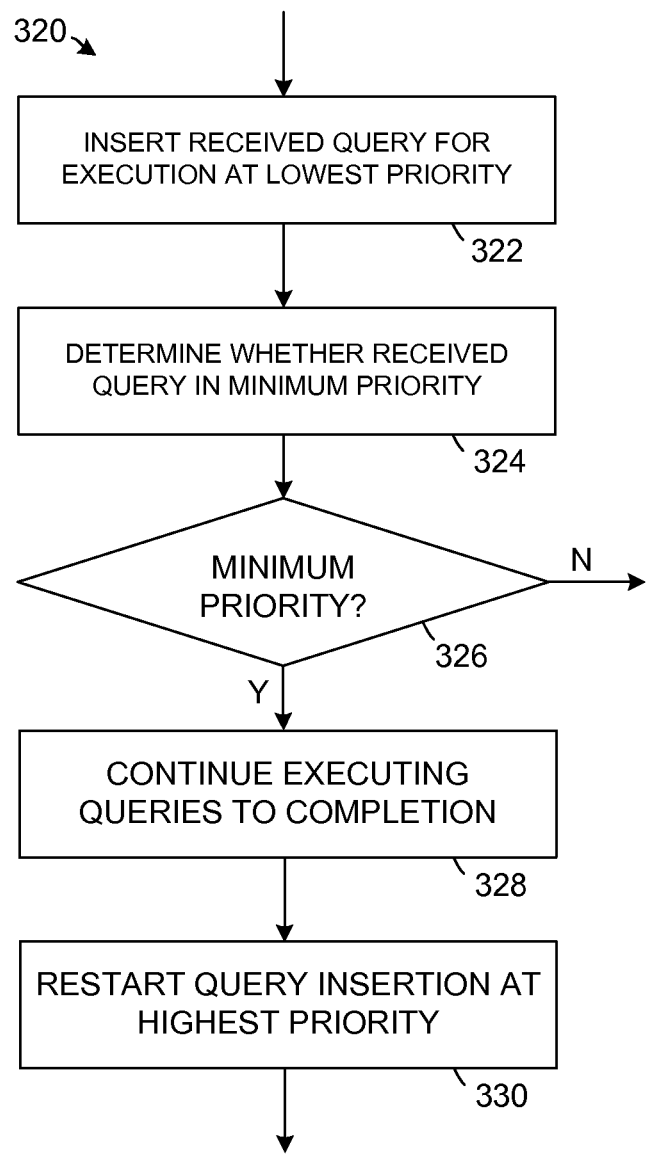

Referring to FIG. 3C, a flow chart illustrates computer-executed method 320 for streaming queries using priority elevation or bumping. The method 320 comprises inserting 322 a received query for execution on the system at a priority lower than queries currently executing on the system and determining 324 whether the priority of the received query is a predetermined minimum priority. If at minimum priority 326, the currently executed queries continue executing 328 until completion without inserting addition queries and query insertion is restarted 330 at a predetermined highest priority.

Figure 3D:
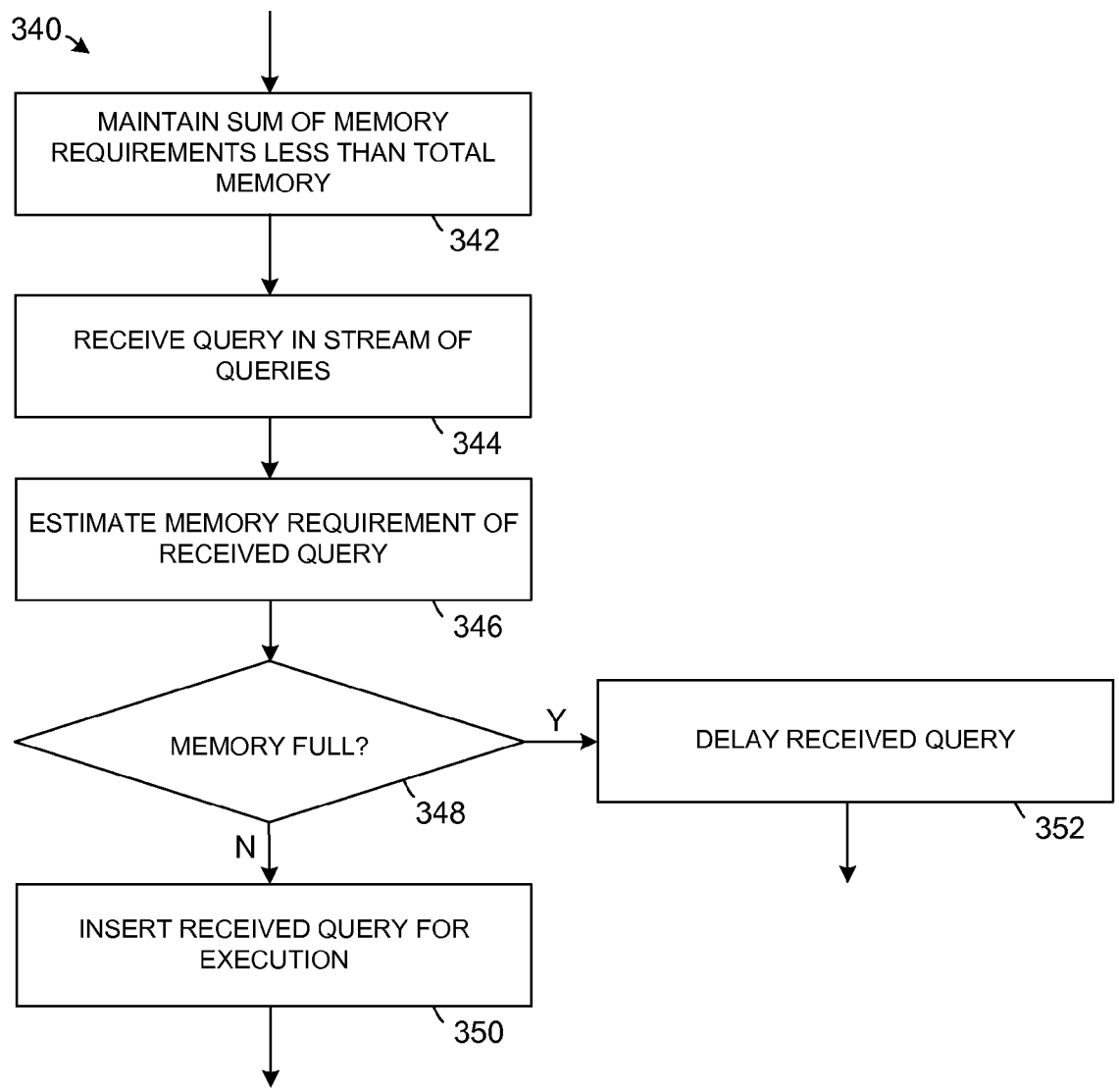

Referring to FIG. 3D, a flow chart depicts a further embodiment of a computer-executed method 340 for executing a query stream using priority gradient programming. The method 340 comprises maintaining 342 a sum of memory requirements for queries executing on the system that is less than total system memory, receiving 344 a query in a stream of queries, and estimating 346 a memory requirement of the received query. If the estimated memory requirement plus the maintained sum is less than the total system memory 348, the received query for execution on the system is inserted 350. If the assigned memory requirement plus the maintained sum is greater than or equal to the total system memory 348, execution of the received query is delayed 352.

Figure 3E:
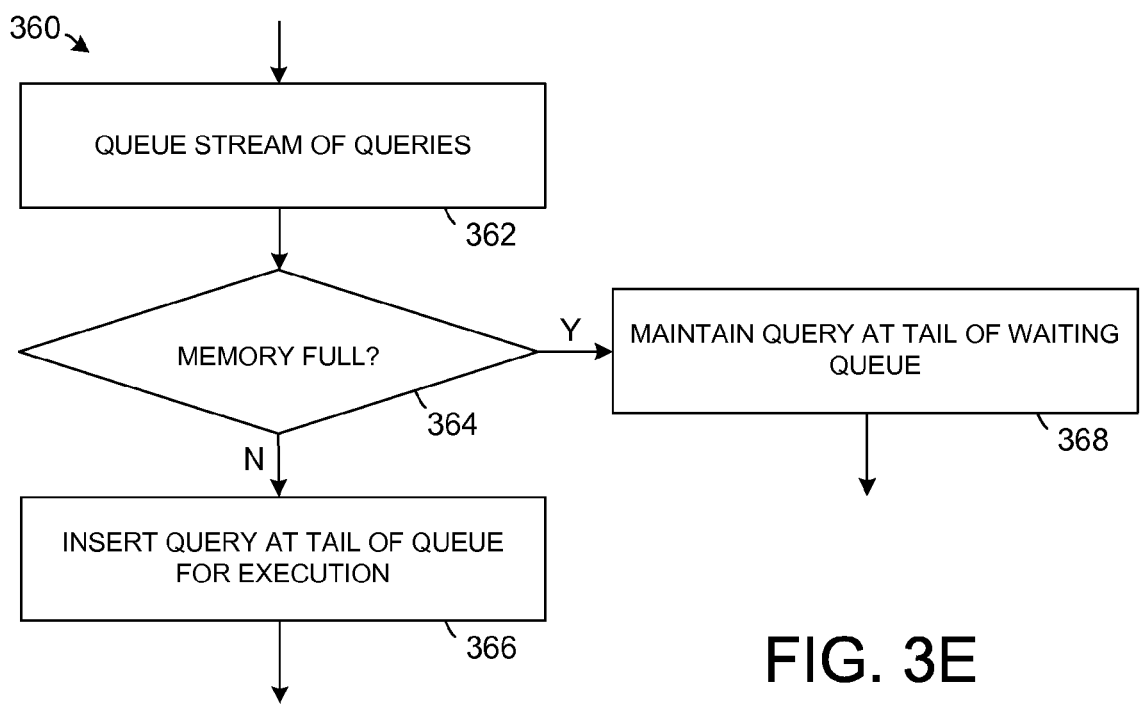

Referring to FIG. 3E, a flow chart depicts a further embodiment of a computer-executed method 360 for executing a query stream using priority gradient programming. The method 360 comprises queuing 362 the stream of queries in a waiting queue in order of arrival. If the assigned memory requirement plus the maintained sum is less than the total system memory 364, a query at the tail of the waiting queue is inserted 366 for execution on the system. If the assigned memory requirement plus the maintained sum is greater than or equal to the total system memory 364, the query is maintained 368 at the tail of the waiting queue.

Typically, queries are inserted in order from the waiting queue for execution.

Referring to FIG. 4, a schematic block diagram depicts an embodiment of a data warehouse server 400 that implements query stream execution using priority gradient programming. The illustrative data warehouse server 400 comprises a data warehouse controller 410 that executes queries at a priority gradient wherein no more than a predetermined number of queries execute at a particular priority. Multiple workloads 412 are communicatively coupled to the data warehouse controller 410. A scheduler 404 is coupled to the data warehouse controller 410 and is configured for running a continuous stream of queries in a multi-programming level (MPL) of concurrent query streams. The scheduler 404 schedules queries for execution on the data warehouse server 400 and restricts the queries to a number that consumes less than total memory 406 in the server 400. The scheduler 404 is further configured to insert a received query for execution on the data warehouse server 400 at a priority lower than queries currently executing on the server 400, detects completion of a query executing on the data warehouse server 400, and increments priority of all queries with priority less than the completing query.

An illustrative technique creates a priority gradient of queries streaming into an Enterprise Data Warehouse (EDW). A priority gradient is defined as the maximum number, for example k, queries that can be executed at any given priority. Expressed differently, at every priority level at most k queries are executing. Typically the priority gradient k can be set equal to one (k=1). In the illustrative example, every priority level is assumed to be assigned only once while a query is executed. The step size or the difference between two successive priorities is typically set to a constant, here assigned j, permitting the largest possible number of queries being assigned a valid priority. Typically, constant j is set to one k=1) but for some systems where different operations of a query are assigned different priorities by the executor, constant j can be larger. For example, Neoview Enterprise Data Warehouse which is made available by Hewlett-Packard Company of Palo Alto, Calif., constant j can be set to two. In a stream setting, queries arrive continuously and for most systems the number of available priority levels is fixed. Considerations for practically implementing a priority gradient in a continuous stream include selection of the number of queries to be executed and the manner in which the queries are to be executed.

In an illustrative implementation, the number of queries to be executed can be selected assuming a continuous setting for PGM. At any point, the number of queries $q_i$ that can execute can be set such that $\Sigma m_i \approx M$, where $m_i$ is the memory requirement of a query and M is the total available system memory.

The queries are inserted in order of arrival.

Multiple queries $(q_1, q_2, \ldots, q_n)$ run on the system such $\Sigma m_i = M_l$ and $M_l < M$. When a query q enters the system, the new query q is inserted for execution only if $M_1 + m < M$, where m is the memory requirement of a new query. Otherwise the query is kept at the tail (or head in some embodiments) of the waiting queue. Queries are inserted in order from the waiting queue for execution. If the size of the workload is greater than the amount of memory available on the system, thrashing can result, which in turn results in severe performance deterioration. The number of queries is thus restricted such that the memory requirement imposed by the queries does not exceed the available system memory. Estimation of the memory requirement of queries is difficult and can be inaccurate, thus resulting in underestimation of the memory requirement. Running queries on a gradient as in PGM makes the system much more robust with regards to underestimates of memory requirement. In PGM, queries are executed at different priorities such that a gradient of priorities is created, resulting in queries requesting and releasing resources at different rates. Memory is a resource that typically has a very large range and highly variable requirement for the different queries, which is a primary cause for thrashing.

The technique of Continuous-Priority Gradient Multiprogramming (PGM) which is disclosed herein is effective in protecting against overload, making admission control based on memory more feasible. In systems with batch workloads, PGM can extend the optimal region to workloads of size between one-third times the memory available on the system and three times the memory available on the system. Continuous-PGM is much more robust for underestimates of memory requirement of a query than systems wherein queries are executed at the same priority. The method of executing queries at the same priority can be called as Equal Priority Multiprogramming (EPM). EPM is robust for a reasonable range of overestimates, such that if the size of a workload is over-estimated and actual memory required is less then throughput would still be in the optimal region. However, EPM is unstable for underestimates, in which a sudden drop in throughput occurs as the size of the workload increases beyond the available memory. For instance, workload is optimally executed under the EPM execution control between the workload sizes of one-third times the memory available on the system and one times the memory available on the system.

The second consideration of Continuous-PGM implementation is how to execute the set of queries. By the PGM definition, queries are executed on a priority gradient. The challenge is how to insert a new query. To maintain the priority gradient the new query is executed at the lowest priority. For example, for a set of queries $(q_1, q_2, \ldots, q_n)$ running at priorities $(p_1 < p_2 < \ldots < p_n)$ respectively, the new query can be executed only at priority n+1. However, if a query in the middle finishes, for example $q_i$, a new query cannot simply be inserted at priority i. Inserting query in the middle of the priority gradient makes the system more susceptible to underestimates in memory prediction. If new queries are continually inserted at a lower priority than the lowest running priority without inserting queries in the available priority levels that have priorities greater than the lowest running priority, then at some point the number of available priority levels available will run out. Techniques for conserving available priority levels include compaction and elevation (also called bumping up).

In the compacting technique, when no additional priority levels less than the lowest running priority level are available, then the existing queries are allowed to finish and restart with the highest priority level. The disadvantage of compaction can be that during the time when the queries are allowed to finish, the system can become under-loaded, wherein the system is capable of a higher throughput.

In the elevation or bumping up technique, when a set of queries ($q_1, q_2, \ldots, q_n$) are running at priorities ($p_1 < p_2 < \ldots < p_n$) respectively, and a query $q_i$ finishes, then all the queries $q_j$ for $j > i$, are bumped in the priority such that query $q_{i+1}$ will run at priority i, query $q_{i+2}$ will run at priority i+1, ..., and query $q_n$ will run at priority n−1. The first new query will be executed at priority n and so on in sequence.

The continuous-PGM is an execution mechanism for a continuous stream of queries on a system such as an Enterprise Data Warehouse. Advantages of continuous-PGM include avoidance or delay of thrashing, maintaining high throughput in the optimal range of executing queries, enabling smooth processor (CPU) and storage (disk) utilization. Continuous-PGM efficiently handles workload fluctuations and does not require advance knowledge of query cost (weight).

Terms "substantially", "essentially", or "approximately", that may be used herein, relate to an industry-accepted tolerance to the corresponding term. Such an industry-accepted tolerance ranges from less than one percent to twenty percent and corresponds to, but is not limited to, functionality, values, process variations, sizes, operating speeds, and the like. The term "coupled", as may be used herein, includes direct coupling and indirect coupling via another component, element, circuit, or module where, for indirect coupling, the intervening component, element, circuit, or module does not modify the information of a signal but may adjust its current level, voltage level, and/or power level. Inferred coupling, for example where one element is coupled to another element by inference, includes direct and indirect coupling between two elements in the same manner as "coupled".

The illustrative block diagrams and flow charts depict process steps or blocks that may represent modules, segments, or portions of code that include one or more executable instructions for implementing specific logical functions or steps in the process. Although the particular examples illustrate specific process steps or acts, many alternative implementations are possible and commonly made by simple design choice. Acts and steps may be executed in different order from the specific description herein, based on considerations of function, purpose, conformance to standard, legacy structure, and the like.

The block diagrams and flow charts further describe an article of manufacture comprising a controller-usable medium having a computer readable program code embodied in a controller for handling media content and aggregating media content from a client of a plurality of clients onto a server.

In another embodiment, PGM can be used to enhance a feed-forward approach to MPL since PGM is less sensitive to mistakes in memory requirement computation due to an increase in the span of the optimal range in a throughput curve.

PGM can be used in various applications. For example, PGM can be used to improve performance in OLTP (On-line Transaction Processing) systems to address thrashing due to data contention.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims.

What is claimed is:

1. A method comprising:
   restricting queries for execution on a system to a number that consumes less than total system memory; and
   executing the queries according to a priority gradient defining two or more priorities wherein no more than numbers of queries that (1) correspond to the two or more priorities and (2) are defined by the priority gradient are executed at respective ones of the two or more priorities.

2. The method according to claim 1 further comprising:
   inserting a received query for execution on the system at a priority lower than priorities of the queries currently executing on the system;
   detecting completion of one of the queries executing on the system having a first priority; and
   incrementing the priorities of queries having a prior priority less than the first priority.

3. The method according to claim 1 further comprising:
   maintaining a sum of memory requirements for the queries executing on the system;
   receiving a query in a stream of queries;
   estimating a memory requirement of the received query;
   inserting the received query for execution on the system if the estimated memory requirement plus the maintained sum of memory requirements is less than the total system memory; and
   delaying execution of the query if the assigned memory requirement plus the maintained sum is greater than or equal to the total system memory.

4. The method according to claim 1 wherein no more than one-query executes—at each of the two or more priorities, and successive priorities are separated by a step size and a number of the priorities is fixed.

5. The method according to claim 1 further comprising:
   inserting a received query for execution on the system at a priority lower than the two or more priorities of the queries currently executing on the system; and
   determining whether the priority of the received query is a minimum priority and, if so:
   continue executing the currently executing queries until completion without inserting additional queries; and
   restarting query insertion at a highest priority.

6. The method according to claim 3 wherein the query is received in a stream of queries, and further comprising:
   queuing the stream of queries in a waiting queue in order of arrival;
   inserting a second query at a tail of the waiting queue for execution on the system if the a second memory requirement of the second query plus the maintained sum is less than the total system memory;
   maintaining the second query at the tail of the waiting queue if the second memory requirement plus the maintained sum is greater than or equal to the total system memory; and
   inserting queries in order from the waiting queue for execution on the system.

7. A workload management system comprising:
a database system to execute queries in accordance with a priority gradient defining two or more priorities wherein no more than numbers of queries that (1) correspond to the two or more priorities and (2) are defined by the priority gradient are executed at respective ones of the two or more priorities; and
a scheduler to schedule the queries for execution on the database system and to restrict the queries to a number that consumes less than total system memory.

8. The system according to claim 7 wherein the scheduler is to insert a received first query for execution on the database system at a priority lower than priorities of the queries currently executing on the database system, the scheduler is to detect completion of a second query executing on the database system, and the scheduler is to increment the priorities of the queries with priorities less than the second query.

9. The system according to claim 7 wherein the scheduler is to:
maintain a sum of memory requirements for the queries executing on the database system that is less than the total system memory;
estimate a memory requirement of a received query;
insert the received query for execution on the database system if the estimated memory requirement plus the maintained sum is less than the total system memory; and
delay execution of the received query if the assigned memory requirement plus the maintained sum is greater than or equal to the total system memory.

10. The system according to claim 9 further comprising:
a waiting queue to queue a stream of queries in order of arrival, wherein the received query is received in the stream of queries, and the scheduler is to insert a second query at a tail of the waiting queue for execution on the database system if a second memory requirement of the second query plus the maintained sum is less than the total system memory, and to maintain the second query at the tail of the waiting queue if the second memory requirement plus the maintained sum is greater than or equal to the total system memory.

11. The system according to claim 10 wherein the scheduler is to insert queries in order from the waiting queue for execution.

12. The system according to claim 7 wherein no more than one query executes at each of the at least two priorities.

13. The system according to claim 7 wherein successive priorities are separated by a predetermined step size and a number of available priorities is fixed.

14. The system according to claim 7 wherein the scheduler is to insert a received query for execution on the database system at a priority lower than the priorities of the queries currently executing on the database system, and when the priority of the received query is a below a first threshold priority the scheduler is to:
execute the currently executed queries until completion without inserting addition queries; and
restart query insertion above a second threshold priority.

15. A non-transitory machine readable medium comprising machine readable instructions which, when executed, cause a machine to:
restrict queries for execution on a system to a number that consumes less than total system memory; and
execute the queries according to a priority gradient defining two or more priorities wherein no more than numbers of queries that (1) correspond to the two or more priorities and (2) are defined by the priority gradient are executed at respective ones of the two or more priorities.

* * * * *

UNITED STATES PATENT AND TRADEMARK OFFICE
CERTIFICATE OF CORRECTION

| | | |
|---|---|---|
| PATENT NO. | : 9,043,353 B2 | Page 1 of 1 |
| APPLICATION NO. | : 12/251220 | |
| DATED | : May 26, 2015 | |
| INVENTOR(S) | : Abhay Mehta et al. | |

It is certified that error appears in the above-identified patent and that said Letters Patent is hereby corrected as shown below:

IN THE CLAIMS

In column 8, line 59, in Claim 6, delete "the a" and insert -- the --, therefor.

Signed and Sealed this
Sixth Day of October, 2015

Michelle K. Lee
*Director of the United States Patent and Trademark Office*